United States Patent [19]

Davis et al.

[11] 4,288,416
[45] Sep. 8, 1981

[54] PROCESS FOR MANUFACTURING TITANIUM COMPOUNDS

[75] Inventors: Brian R. Davis, Bricktown; Joseph A. Rahm, Long Branch, both of N.J.

[73] Assignee: NL Industries, Inc., New York, N.Y.

[21] Appl. No.: 151,999

[22] Filed: May 30, 1980

Related U.S. Application Data

[63] Continuation-in-part of Ser. No. 65,450, Aug. 10, 1979, abandoned.

[51] Int. Cl.³ .................... C01G 23/053; C01G 23/00
[52] U.S. Cl. ........................... 423/82; 423/83; 423/85; 423/86; 75/1 T
[58] Field of Search ................ 423/82, 83, 85, 86, 423/69; 75/1 T

[56] References Cited

U.S. PATENT DOCUMENTS

| | | | |
|---|---|---|---|
| 1,338,473 | 4/1920 | Wrigley et al. | 423/83 |
| 1,504,669 | 8/1924 | Blumenfeld | 423/300 |
| 1,504,670 | 8/1924 | Blumenfeld | 423/85 |
| 1,504,671 | 8/1924 | Blumenfeld | 106/300 |
| 2,617,724 | 11/1952 | Espenschied | 423/82 |
| 3,071,439 | 1/1963 | Solomka | 423/610 |
| 3,647,414 | 3/1972 | Nilsen | 423/83 |
| 3,760,058 | 9/1973 | Langmesser et al. | 423/85 |
| 3,784,670 | 1/1974 | Yamada et al. | 423/82 |

*Primary Examiner*—Herbert T. Carter
*Attorney, Agent, or Firm*—Gary M. Nath; Eugene Striffler

[57] ABSTRACT

A process is provided for the manufacture of titanium compounds and particularly titanium dioxide wherein excess titaniferous bearing material is reacted with dilute sulfuric acid having a concentration of between about 25% and about 60% by weight at a temperature below about 140° C. Thereafter, the titanium sulphate may be recovered or processed to provide titanium dioxide hydrate accompanied by recycling the spent acid for reaction with the titaniferous bearing material charged to the process. The titanium hydrate may be calcined to provide titanium dioxide pigment.

16 Claims, 1 Drawing Figure

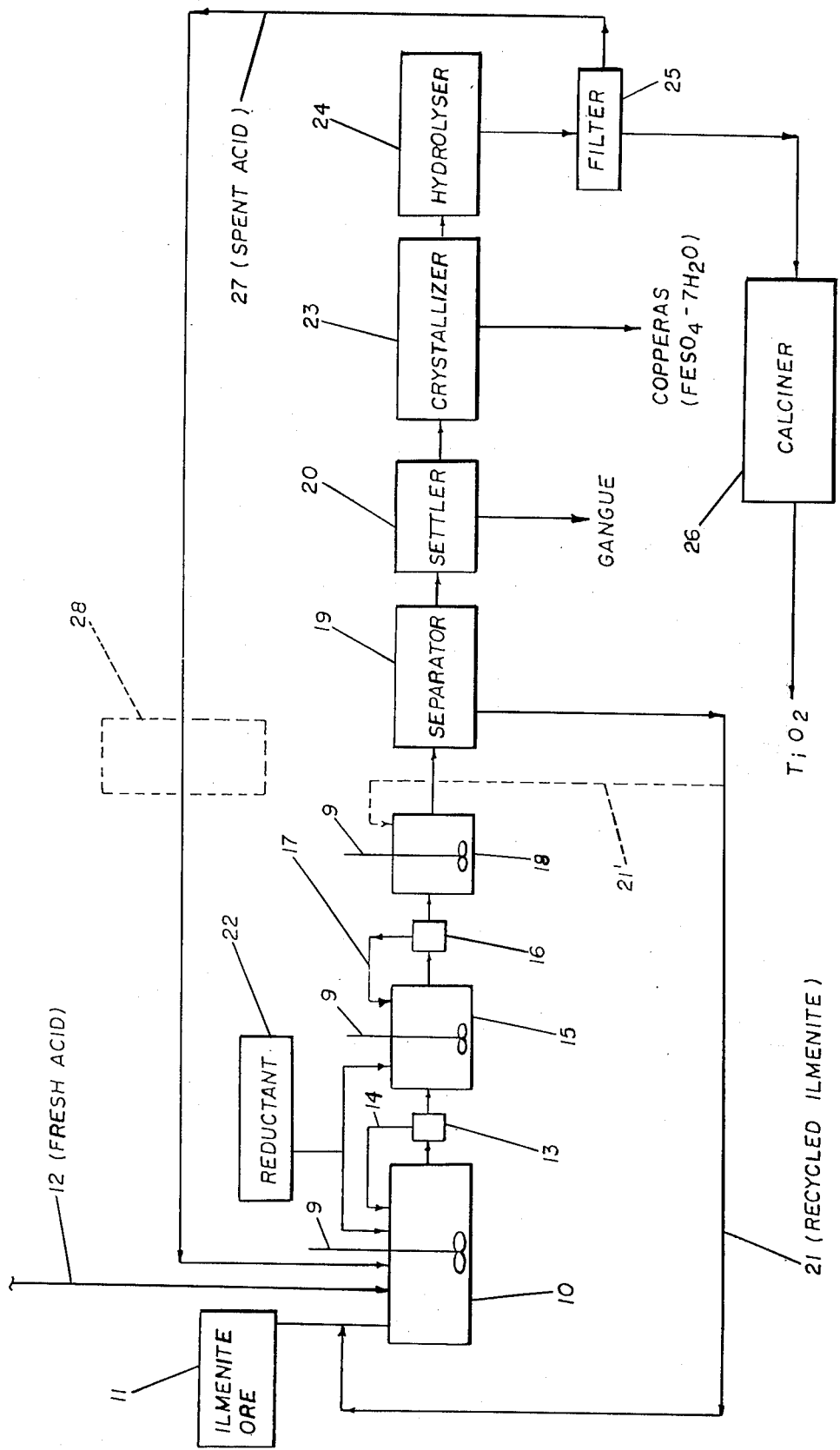

PROCESS FOR MANUFACTURING TITANIUM COMPOUNDS

RELATED APPLICATIONS

This application is a continuation-in-part application of copending application Ser. No. 65,450, filed Aug. 10, 1979 and now abandoned.

The present invention relates to the manufacture of titanium compounds and particularly titanium dioxide pigmentary material. More particularly, the present invention is directed to a novel process for reacting titaniferous bearing material with dilute sulfuric acid for preparing salt solutions of titanium that may be hydrolyzed to provide titanium dioxide pigment.

Titanium dioxide is a well known material having desirable pigment properties which is useful in paint and coating compositions and in plastic materials. Several different processes are known for manufacturing titanium dioxide material including, for example, the sulphate process and the chloride process. The present invention concerns the manufacture of titanium compounds and particularly titanium dioxide by the sulphate process.

In the usual sulphate process for the manufacture of titanium compounds, titaniferous bearing material such as ilmenite ore which includes massive ilmenite, ilmenite sands and titaniferous or furnace slag are reacted with concentrated sulfuric acid (e.g., 90%–96% sulfuric acid). The reaction is sometimes referred to as "digestion" or "ore digestion." The digestion reaction of the titaniferous material and concentrated sulfuric acid is exothermic in nature and proceeds very violently. Typically, the titaniferous material and the concentrated sulfuric acid are placed in a reaction vessel called a digestion tank. Water is usually added to the digestion tank to initiate and accelerate the acid-ore reaction because of the heat of dilution of the acid which results in a vigorous boiling action of the water-acid solution at about 100° C. to about 190° C. and the release of vast quantities of steam and vapor having entrained particulate material. As the violent reaction proceeds, water is expelled and the reaction mass becomes solid; the reaction is completed in the solid phase at a temperature of approximately 180° C. The solid reaction mass, referred to as a "cake," is allowed to cool. Thereafter, the solid cake is dissolved with water or dilute acid to provide a solution of sulphate salts of iron, titanium and other trace metals present in the titaniferous material. The digestion operation is a batch procedure carried out in a single digestion tank. As many digestion tanks are used as necessary according to the desired capacity of the manufacturing plant to prepare a titanium sulfate solution.

After digestion, the resulting sulphate salt solution (containing iron and titanium salts) is further processed by known measures to remove the ferrous sulphate, usually referred to as "copperas," to provide a solution of titanyl sulphate which, upon hydrolysis, yields hydrated titanium dioxide. The titanium dioxide hydrate is usually subjected to a calcination treatment in a suitable kiln device to remove the water of hydration and to provide the anhydrous titanium dioxide pigment. The foregoing process is described in greater detail in, for example, U.S. Pat. Nos. 1,504,672; 3,615,204 and 3,071,439.

The sulphate process for the manufacture of titanium compounds described hereinabove has several environmental drawbacks. For example, the violent reaction that occurs in the digestion tank results in undesirable emission problems. Also, solutions of dilute sulfuric acid, usually termed "spent acid," that result from the removal of copperas and the hydrolysis of the titanyl sulphate present severe disposal problems because large quantities of such spent acid cannot be recycled to the digestion tank which utilizes concentrated sulfuric acid or reclaimed on an economic basis.

Accordingly, the present invention provides a novel sulphate process for manufacturing titanium compounds that substantially avoids or eliminates the drawbacks mentioned hereinabove resulting from the conventional sulphate process. As used herein, the term titanium sulphate is used collectively to mean sulphate salts of titanium, such as titanyl sulphate and titanous sulphate.

According to the present invention, there is provided a process for preparing titanium compounds which comprises: reacting (a) a titaniferous bearing material in an amount between about 10% and 400% above the stoichiometric amount of said material necessary to react with sulfuric acid to provide titanium sulphate, and (b) a dilute sulfuric acid solution having a concentration between about 25% and about 60% by weight, based upon the total weight of said solution, at a temperature below about 140° C., and thereafter cooling the resulting reaction mixture to a temperature below about 110° C. without precipitating the reaction products to produce a reaction mixture containing titanium sulfate, and separating undissolved solids to produce a titanium sulfate solution.

In a preferred embodiment, the process of the present invention comprises: (1) reacting (a) a titaniferous bearing material in an amount between about 10% and about 400% above the stoichiometric amount of said material necessary to react with sulfuric acid to provide titanium sulphate, and (b) a dilute sulfuric acid solution having a concentration between about 25% and about 60% by weight, based upon the total weight of said solution, at a temperature below about 140° C.; (2) cooling the resulting reaction mixture to a temperature below about 110° C., without precipitating the reaction products; (3) removing undissolved solids and iron sulfate from said reaction mixture to provide a titanium sulphate solution; (4) hydrolyzing said titanium sulphate solution to provide a hydrate of titanium dioxide; (5) calcining said hydrate of titanium dioxide to provide titanium dioxide and (6) recovering the titanium dioxide.

In still another embodiment, the present invention provides a continuous process for production of titanium dioxide which comprises:

(1) continuously reacting (a) a titaniferous bearing material in an amount between about 10% and about 400% above the stoichiometric amount of said material necessary to react with sulfuric acid to provide titanium sulphate, and (b) a dilute sulfuric acid solution having a concentration between about 25% and about 60% by weight, based upon the total weight of said solution, in a first reaction vessel at a temperature below about 140° C.

(2) cooling the resulting reaction mixture to a temperature below about 110° C. in a second reaction vessel without precipitating the reaction products;

(3) separating unreacted titaniferous bearing material from the reaction mixture to provide a solution of iron sulphate and titanium sulphate;
(4) removing iron sulfate from said solution of iron sulfate and titanium sulfate to provide a solution of titanium sulphate;
(5) hydrolyzing said solution of titanium sulphate to provide a titanium dioxide hydrate, and spent sulfuric acid solution;
(6) calcining said titanium dioxide hydrate to provide titanium dioxide and
(7) recovering titanium dioxide.

The attached FIGURE depicts one aspect of the present invention using a continuous process scheme for preparing titanium dioxide.

The salient features of the inventive process reside in the discovery that a titaniferous bearing material may be reacted in a completely liquid phase without the need for a separate reduction step with dilute sulfuric acid to provide a stable hydrolyzable titanium sulphate solution which may be used for making titanium compounds and titanium dioxide pigments.

The digestion reaction is conducted with a titaniferous bearing material. As used herein, the term titaniferous bearing material means a material containing recoverable titanium values when treated according to the process of the invention. Exemplary materials include titaniferous slag, furnace slag, ilmenite ores such as magnetic ilmenite and massive ilmenite and ilmenite sands.

The digestion reaction is conducted with a sufficient amount of the titaniferous bearing material to provide an excess of said material in an amount between about 10% and about 400% above the stoichiometric amount. This amount may also be represented as being 1.1 to 5 times the stoichiometric amount. The following formula depicts the stoichiometry of the digestion reaction:

$$FeTiO_3 + 2H_2SO_4L \rightarrow TiOSO_4 + FeSO_4 + 2H_2O$$

The use of excess titaniferous bearing material in the digestion reaction is effective and desirable for achieving a successful and workable process according to the present invention without the need for excessive grinding of the ore. The titaniferous bearing material preferably has a surface area ranging between about 0.05 m²/cc to about 0.6 m²/cc. Ore having a higher surface area could be used but provides no advantage because of increased grinding costs. As indicated hereinabove, an excess of titaniferous bearing material between about 10% and about 400% above the stoichiometric amount necessary for reacting with sulfuric acid should be employed in the digestion reaction of the process. The use of lesser amounts of said mixture results in unacceptably low reaction rates and long processing times so that the process becomes economically unattractive. Using amounts of excess material higher than recommended is undesirable due to greatly reduced fluidity of the reaction mixture and the need to recycle large quantities of unreacted titaniferous bearing material to the digestion reactors. It has been unexpectedly observed, for example, that doubling the amount of titaniferous bearing material such as MacIntyre ore above the stoichiometric amount for reacting with dilute sulfuric acid increases the rate of reaction in the order of at least 10 times in the last digestor. It should be recognized that reaction rates will vary with the source of titaniferous material employed during digestion.

The sulfuric acid utilized in the process of the invention should have a concentration of between about 25% and about 60% by weight, based upon the total weight of the acid solution. An acid concentration below about 25% by weight is not desirable because hydrolysis of the titanium dioxide occurs during and in conjunction with the digestion reaction when using such acids. Premature hydrolysis of titanium salt solutions precludes the formation of pigment grade titanium dioxide at a later stage of the process. Also, utilizing an acid having a concentration greater than about 60% by weight is not desirable because (1) the resulting reaction solution is more viscous and difficult to handle, (2) the economics of recycling spent acid are not realized unless the spent acid is concentrated, which unnecessarily increases the cost of operation, and (3) the higher concentration of reaction products in solution promotes the precipitation of ferrous sulphate monohydrate and recoverable titanyl sulfate dihydrate. The presence of the ferrous sulphate monohydrate makes gravity separation ineffective and is difficult to remove by filtration.

The process operating conditions for conducting the digestion reaction may readily be adjusted, depending upon the concentration of the dilute sulfuric acid and the specific amount of excess titaniferous bearing material that is employed, to provide optimum process operation. To illustrate, utilizing dilute sulfuric acid of low concentration, e.g., below 40% by weight, initially requires operating the process at a lower temperature of the preferred temperature range because of the lower boiling point of the dilute sulfuric acid. It is desirable to increase the amount of titaniferous bearing material employed so as to digest as much material as possible in the first digestor reactor at which point the operating temperature and reaction rate are usually higher. As noted hereinbelow, the temperature in subsequent digestor reactors is maintained at a level lower than the first digestor reactor and, ultimately, must be reduced to preclude or avoid premature hydrolysis of the titanium salt solution.

The temperature at which the digestion reaction occurs is below about 140° C. and preferably between about 55° C. and the boiling point of the reaction solution, i.e., between about 55° C. and about 140° C. Selecting a temperature that is too low in a digestion reaction should be avoided because the digestion reaction will proceed too slowly and thus require increased residence time of the reactants in the digestion reactor. Also, increased residence times should be avoided to preclude the risk of undesirable nuclei formation in the reaction solution due to premature hydrolyzation of the titanium salt. Selecting a temperature about 140° C. is not recommended because the titanium salt hydrolyzes at much faster rates at higher temperatures. Operating the digestion reaction below about 55° C. should be avoided because the reaction products begin to precipitate from solution and the viscosity of the reaction mixture increases, making removal of unreacted solids very difficult. A preferred operating temperature for conducting the digestion reaction is between about 70° C. and 110° C. It should be noted that the digestion reaction of the process of the present invention may be accomplished as a batch reaction, e.g., in a reaction vessel from which the reaction mixture, after the digestion reaction has proceeded to a desired extent, is withdrawn and processed further in other vessels. A preferred embodiment of the process of the invention is where the digestion reaction is performed continuously in at least two reaction vessels and wherein the titaniferous bearing material and the dilute sulfuric acid are made to flow concurrently.

When conducted in a continuous manner, the process is preferably performed using two or more digestor reactors. The total number of digestors being dependent upon the ease of reaction control, plant output and process handling.

The preferred operating temperatures for conducting the digestion reaction in two digestor reactors or stages are wherein the first digestor is maintained below about 140° C. preferably below about 110° C. and the second digestor is maintained below about 100° C., preferably below about 75° C.

The preferred operating temperatures for conducting the digestion reaction in three digestor reactors or stages, are wherein the first digestor is maintained below about 140° C. preferably below about 110° C., the second digestor is below about 110° C. preferably below about 100° C. and the third digestor is maintained below about 80° C. preferably below about 75° C.

The preferred operating temperatures for conducting the digestion reaction in four digestor reactors or stages are wherein the first digestor is maintained below about 140° C. preferably below about 110° C., the second digestor is maintained below about 110° C. preferably below about 90° C., the third digestor is maintained below about 100° C., preferably below about 86° C. and the fourth digestor is maintained below about 90° C. preferably below about 75° C.

The preferred operating temperatures for conducting the digestion reactor in five digestor reactors or stages are wherein the first digestor is maintained below about 140° C. preferably below about 110° C., the second digestor is maintained below about 110° C., preferably below about 90° C., the third digestor is maintained below about 100° C. preferably below about 85° C., the fourth digestor is maintained below about 90° C., preferably below about 80° C. and the fifth digestor is maintained below about 85° C., preferably below about 75° C.

All of the foregoing digestor temperatures may be varied depending upon the desired yield and reaction times present in each stage. One of the essential and salient features of the invention in providing an operable process is that the temperature of the digestion reaction is decreased as the reaction progresses to preclude or avoid premature hydrolysis of the resulting titanium salt solutions. Premature hydrolysis of the titanium salt solution precludes the formation of pigment grade or quality titanium dioxide.

The duration of the digestion reaction in a digestor is controlled by the optimum degree of conversion or digestion of the titaniferous bearing material at that stage. Generally speaking, it is preferred to digest or react as much of the titaniferous bearing material as is possible in the first digestor reactor or stage where the temperature is maintained at the highest level to preclude hydrolysis of the titanium sulfate in solution. For example, in a continuous multiple stage system employing MacIntyre ore as the source of titaniferous bearing material it is sometimes possible to digest in the first stage up to about 90% by weight of the stoichiometric amount of the ore charged to the process, excluding the excess ore. Preferably, between about 30% and 80%, and most preferably between about 60% and 80% by weight of the stoichiometric amount of the ore is digested in the first stage, excluding the excess ore. Conversion is measured by the amount of reaction completed based on the stoichiometric quantity of titaniferous bearing material employed.

Temperature is used to control the digestion reaction preferably by monitoring the ratio of active acid to titanium in the reaction solution. This ratio is an indication of the degree of conversion or digestion. The term "active acid" means the total quantity of free acid in the reaction solution plus the acid combined with the titanium in the reaction solution. The ratio of active acid to titanium dioxide (active acid:titanium dioxide) is calculated as the sum of both the free acid in solution plus the acid combined with the titanium in solution divided by the titanium in solution (calculated as $TiO_2$). For example, the active acid content of a solution may be determined by titration of a selected sample (by weighing or pipeting techniques) with a 0.5 N caustic solution (NaOH) to a pH of 4.0 in a barium chloride/ammonium chloride buffered solution. The titration yields the content of free acid plus the acid combined with the $TiO_2$ which is referred to as active acid. To illustrate, 60 mls of buffer solution containing 75 g/l of barium chloride and 250 g/l of ammonium chloride is added to the beaker containing the related sample and diluted with water to 250 mls and titrated with 0.5 N caustic to the methyl orange end-point.

In a batch process, the active acid content can vary widely and is not critical except to the extent that digestion and reduction occur in a liquid phase. In a continuous process, the active acid ratio is permitted to drop from infinity at the commencement of the reaction to between 1.50 and 7.0 at the completion of the reaction dependent upon digestion conditions. Typically, the active acid to $TiO_2$ level varies between 2.0 and 3.5. As the active acid level decreases, the stability of the titanyl sulfate solution to the hydrolysis decreases. Generally, the temperature of the reaction solution should be maintained below about 140° C. and preferably below about 110° C. as the ratio of active acid to titanium (calculated as titanium dioxide) falls to about 2.0. To illustrate in a two-stage digestion process, the temperature of the reaction solution in the first stage or digestor of the digestion reaction should be maintained at a temperature below about 140° C., e.g., 110° C., until the ratio of active acid to titanium dioxide of the reaction solution falls to about 3.0, at which time the temperature of the reaction solution is reduced to below about 100° C., e.g., 70° C. In contrast, in a three stage digestion process, wherein the temperature of the first stage is maintained at about 110° C. to provide a reaction mixture having a ratio of active acid to titanium dioxide in the reaction solution in the range of between about 2.5 and about 3.0, and thereafter the reaction is conducted in a second stage at a temperature of about 100° C. to provide a reaction mixture having a ratio of active acid to titanium dioxide in the reaction solution in the range between about 2.2 and about 2.5. The reaction can then be completed in a third stage at a temperature below about 80° C. to provide a reaction mixture having a ratio of active acid to titanium dioxide in the reaction solution of about 2.0.

Upon completion of the digestion reaction, the resulting reaction mixture containing titanium sulfate, iron sulfate and trace element from the titaniferous bearing material may be treated to recover a titanium sulfate solution to prepare titanium compounds or processed according to conventional sulfate processing techniques to prepare titanium dioxide pigment.

Referring to the diagram depicted in the accompanying FIGURE for preparing titanium dioxide in a multistage reactor system, reference numeral 10 represents a digestor reactor. Titaniferous bearing material such as ilmenite ore is adapted to be fed into digestor reactor 10 from ore storage bin 11. Dilute sulfuric acid having a concentration between about 25% and about 60% by weight, based upon the total weight of the acid solution, is adapted to be fed either from a mixture of strong acid (96% by weight) from a source 12 of fresh acid, combined with recycled acid (15% to 45% by weight) or water directly to digestor reactor 10. The ilmenite ore and dilute sulfuric acid in digestor reactor 10 are agitated continuously at a temperature up to the boiling point of the reaction solution in the reactor.

The reactants in digestor reactor 10 are maintained at a temperature below about 140° C. and preferably between about 55° C. and about 140° C. More specifically, the reactants in digestor reactor 10 are preferably maintained at 110° C. Digestor reactor 10 may be maintained at any convenient pressure; atmospheric pressure is preferred for reasons of economy.

When operated continuously in the depicted three stage digestion system, the reaction mixture is transported from digestor reactor 10 to a conventional separator device 13, e.g., a filter or cyclone separator, in which a portion or all of the unreacted ilmenite ore is separated and recycled by way of recycle conduit 14 to digestor reactor 10. Alternatively, the reaction mixture may be continuously transported from digestor reactor 10 to digestor reactor 15 unaccompanied by recycling the unreacted ilmenite ore to digestor reactor 10.

The reaction solution in digestor reactor 15 is preferably maintained at a temperature somewhat lower than the temperature in digestor reactor 10. For example, the reaction mixture in digestor reactor 15 is maintained at about 100° C. Control of the temperature in digestor reactor 15 may be achieved by the addition of recycled acid or water. The pressure in digestor reactor 15 is preferably atmospheric, but higher pressures may be utilized if desired.

The reaction mixture may be continuously transported from digestor reactor 15 to a conventional separator device 16, e.g., filter or a cyclone separator, in which a portion or all of the unreacted ilmenite ore is separated and recycled by way of recycle conduit 17 to digestor reactor 15. Alternatively, the reaction mixture may be continuously transported from digestor reactor 15 to digestor reactor 18 unaccompanied by the recycling of unreacted ilmenite ore to digestor reactor 15.

The reaction mixture in digestor reactor 18 is preferably maintained at about 70° C. and atmospheric pressure.

The reaction mixture from digestor reactor 18 is continuously fed to a suitable separator device 19, e.g., a filter or gravity separator (or multiples thereof in series and/or parallel flow arrangement), in which the unreacted ilmenite ore is separated from the liquid reaction product. The excess or unreacted ilmenite is recycled by way of conduits 21 and 21' to either or both digestor reactor 18 and/or digestor reactor 10. The liquid reaction product from separator device 19 is conveyed to settler device 20, e.g., a conventional settler device or a LAMELLA ® device, in which gangue or other undesirable solid material is removed from the reaction product. The use of a LAMELLA ® settling device is not considered a part of this invention.

As indicated above, the digestion reaction is conducted in digestor reactors 10, 15 and 18. It is not essential that the digestion reaction be conducted in three digestor reactors. In fact, the process may be conducted batch-wise using only one digestor reactor. However, it is preferred to use two or more digestor tanks in order to practice the process in a continuous manner. When utilizing only two digestor reactors, the temperature of the second digestor reactor, such as digestor reactor 15, may be adjusted to a lower temperature as, for example, 70° C.

Also, each digestor reactor should be equipped with suitable agitation means, indicated by reference numeral 9 in the accompanying flow digram, in order to maintain the reactants and the reaction solution well agitated.

A suitable reductant, for example, iron or titanous sulphate, from container 22 may be added to digestor reactor 10 or digestor reactor 15, or to both reactors, for the purpose of reducing trivalent ferric iron in the digestion solution to divalent ferrous iron. The presence of a reduced condition precludes contamination of later obtained titanium hydrate with ferric salts. The amount of reductant added to the reaction solution in the digestors is dependent upon the amount of ferric iron in the ilmenite feed ore. Generally speaking, between about 3% and about 8% by weight, based upon the total weight of ilmenite ore reacted, of reductant is adequate to provide satisfactory results in a process operation using an ilmenite ore that contains 5% to 13% ferric iron. The addition of a reductant such as iron has another beneficial effect in that it accelerates the rate of the digestion reaction. Thus, it is possible by this measure to avoid a separate reduction stage for the digestion solution as would otherwise be necessary. The reductant may be added at any point in the digestion operation. The quantity of reductant used is chosen so that not only all of the trivalent iron in the ilmenite ore is converted to the divalent state, but also part of the titanium in the reaction solution is reduced to the trivalent state in order to obtain a titanium sulphate solution for hydrolysis that contains trivalent titanium. The presence of trivalent titanium inhibits the formation of ferric iron which would adsorb on the titanium dioxide particles in the subsequent hydrolysis step of the process. Incidentally, the accelerating effect of the iron on the rate of the digestion reaction increases as the particle size of the iron decreases.

A certain quantity of metal sulphates, i.e. ferrous sulfate monohydrate is usually precipitated during the digestion reaction without any noticeable deterioration in the fluidity of the reaction mixture. The ferrous sulphate monohydrate may easily be dissolved at the end of the digestion reaction by the addition of water. At least part of the water may be substituted by titanium sulphate solution which has been freed from a large part of the iron sulphate (by crystallization and separation of ferrous sulphate heptahydrate at a later step of the process discussed below). By this measure, the addition of extra water to the system can be minimized or avoided. Ordinarily, additional water must be removed at a later stage in the process, e.g., by vaporizing.

The water or solution of water and titanium sulphate may be added to the reaction solution in the last digestor tank or at some convenient point between the last digestor tank and separator device 19 to provide cooling. The addition of water or solution of water and titanium sulphate is not considered a part of this invention.

The resulting solution containing titanium sulfate, iron sulfate and trace elements from the ilmenite ore may be recovered and processed to prepare titanium compounds. Alternatively, the solution may be processed to prepare titanium dioxide pigment wherein the reaction solution is passed to settler device 20 to remove solids from solution.

When preparing titanium dioxide, the reaction solution is then conducted from settler device 20 to a crystallizer device 23 wherein the copperas (i.e., ferrous sulphate heptahydrate) is crystallized and removed by known process measures. For example, the solution is cooled in a continuous or batch vacuum crystallizer to about 10° C. to 20° C. by pulling a vacuum of 29 inches of mercury to form large crystals of copperas ($FeSO_4.7H_2O$) which can easily be filtered on a drum or table filter. The cake of copperas may be washed to recover the soluble titanium values. The reaction solution from the filter may be concentrated by known measures, e.g., evaporation, prior to being subjected to hydrolysis. Also, the reaction solution may be clarified either before or after crystallization and removal of the ferrous sulphate heptahydrate. A clarification step prior to crystallization is favorable if it is desired to obtain a ferrous sulphate heptahydrate of high purity which may be processed further, e.g., for producing reagents which will be employed for the purification of water and sewage.

Preferably, the reaction solution is subjected to a fine filtration step prior to hydrolysis. After removing the ferrous sulphate heptahydrate and, if necessary, clarifying and fine filtrating, a titanium sulphate solution is obtained having a favorable ratio of Fe:$TiO_2$ that can be directly hydrolyzed or, optionally, evaporated by known means in a vacuum evaporator to the desired $TiO_2$ concentration, followed by hydrolysis.

The reaction solution from crystallizer 23 consists of a titanyl sulphate ($TiOSO_4$) solution which is fed into hydrolyzer device 24 wherein the titanyl sulphate is hydrolyzed by known process measures to provide titanium dioxide hydrate. Specifically, the titanyl sulphate solution is hydrolyzed to provide insoluble titanium dioxide hydrate by diluting the titanyl sulphate solution with water at elevated temperatures. For example, a predetermined amount of titanyl sulphate solution having a titanium dioxide content of preferably greater than 200 grams per liter is preheated to a temperature above 90° C. and added with agitation to clear water at substantially the same temperature and in the ratio of 3 to 4½ parts of solution to one part of water. The solution is subjected to boiling and titanium dioxide in the form of colloidal particles is precipitated; the colloidal particles flocculate to produce a filterable titanium dioxide hydrate. The manner and means of conducting the hydrolysis step is well known in the art and described, for example, in U.S. Pat. No. 1,851,487 and No. 3,071,439.

Following hydrolysis, the titanium dioxide hydrate is filtered by filtering device 25, such as a Moore filter, and the resulting filter cake is fed into calciner 26 wherein it is heated in a known manner to remove water of hydration and absorbed sulfuric acid to provide titanium dioxide which is suitable for pigment.

A significant advantage of the process of the present invention is that it can reduce or even eliminate the severe "spent acid" disposal problem that is characteristic of the conventional sulphate process for the manufacture of titanium dioxide pigment. Specifically, the spent acid resulting from the digestion, crystallization and hydrolysis steps of the process are reprocessed or recycled for use in conducting the digestion reaction with ilmenite ore. Thus, the process of the present invention can be free or substantially free of waste spent acid.

To illustrate, the spent acid from filter 25 is conducted by conduit 27 and returned to digestor reactor 10. If desired, the spent acid from filter 25 may be concentrated as by evaporation in a known manner in concentrator device 28 prior to being returned to digestor reactor 10.

An additional and significant advantage of the process of the present invention is that the recycled spent acid may be introduced directly into any one or all of the digestor reactors to control the temperature in each digestor reactor. The foregoing provides a convenient and effective manner for balancing and controlling the reaction temperature between the reactors.

The principle and practice of the present invention is illustrated in the following Examples which are exemplary only and it is not intended that the invention be limited thereto since modifications in technique and operation will be apparent to anyone skilled in the art. All parts and percentages specified herein are by weight unless otherwise indicated. Conversions are measured by the amount of reaction undergone by a stoichiometric quantity of ore treated.

Procedures and tests specified herein and in the Examples herebelow were conducted as follows:

SURFACE AREA was measured by the sedimentation method described in: Jacobsen, A. E. and Sullivan, W. F., "Method For Particle Size Distribution for the Entire Subsieve Range," Vol. 19, Page 855 Analytical Chemistry (November, 1947).

EXAMPLE 1

800 grams of ilmenite ore (MacIntyre Ore) having a surface area of 0.39 $m^2$/cc was charged to a digestor reaction vessel. 1.16 liters of 43% by weight sulfuric acid was added to the reaction vessel. The temperature of the reactants was raised to 108° C. by heating under constant agitation with an agitator made of TEFLON® material. After fifty minutes, a 15 cc sample of the reaction mixture was filtered by gravity through a glass filter paper into a 100 ml polypropylene beaker. The filtrate was analyzed for active acid content and titanium content (expressed as $TiO_2$). The active acid content was 430 g/l to provide a ratio of active acid:titanium of 7.1.

The conversion of the reaction was determined after about 1¼ hours by analyzing a sample of the reaction solution. The filtrate analyzed had an active acid content of 396.9 g/l $H_2SO_4$ and a titanium content of 78.5 g/l ($TiO_2$).

After about 1¼ hours, 17 grams of powdered iron was added to the reaction vessel to provide a reductant for the ferric iron content of the reaction mixture.

After about 1¾ hours, the temperature of the reaction mixture was lowered to 70° C. by placing the reaction vessel in a tray of cooling water. Analysis of a portion of the reaction solution, after cooling and removal of undissolved solids, showed an active acid content of 353.3 g/l $H_2SO_4$ and a titanium content of 89.25 g/l ($TiO_2$) providing a ratio of active acid:titanium of 3.96.

The reaction mixture was maintained at a temperature of 70°–74° C. for about 15 hours. The reaction mixture was cooled to about 50° C. to quench the reaction, filtered to remove undissolved solids, and analyzed for active acid and titanium content. The active acid content was 275.8 g/l and the titanium content was 136.2 g/l (TiO$_2$) to provide a ratio of active acid:-titanium of 2.025.

The reaction solution was stable and suitable for hydrolysis to prepare titanium dioxide pigment. A titanium dioxide pigment may be prepared from the reaction solution according to conventional processing techniques.

EXAMPLE 2

A two-stage system was constructed consisting of a heated, agitated 5-liter first stage reactor overflowing into a heated, agitated 25-liter second stage reactor. MacIntyre ilmenite ore having a particle size distribution as follows (U.S. Standard Screens):

| Mesh | Wt % |
|---|---|
| +100 | 1.2 |
| +200-100 | 35.8 |
| +325-200 | 23.0 |
| +400-325 | 6.0 |
| -400 | 34.0 | and containing 46.8% TiO$_2$ was continuously fed into the first stage at a rate of 3.78 gms/minute. A dilute sulfuric acid solution having the following analysis:

| 29.9% | Free H$_2$SO$_4$ |
|---|---|
| 1.4% | Titanous Sulfate (as TiO$_2$) |
| 3.3% | Soluble Titanium (as TiO$_2$) | was also fed into the first stage at a rate of 12.5 milliliters/minute. The titanous sulfate was added to the reaction vessel to provide a reductant for the ferric iron content of the reaction mixture. Both stages were initially charged with sufficient ore to provide a 100% excess over the stoichiometric requirement. Unreacted ore overflowing from the second stage was recycled to the first stage, in order to maintain this excess ore in the system. The first stage reactor was controlled at 106° C. while the second stage reactor was controlled at 71° C. The first and second stages had residence times of about 6.8 hours and 34.2 hours, respectively. After sufficient time elapsed for equilibrium to be established, it was found that 54.2% of the TiO$_2$ in the ore feed was reacted in the first stage, and 28.2% was reacted in the second stage. An overall conversion of 82.4% was achieved with the two stages. Analysis of the final product was:

| 9.4% | Soluble Titanium (as TiO$_2$) |
|---|---|
| 9.0% | Free H$_2$SO$_4$ |
| 0.3% | Titanous Sulfate (As TiO$_2$) |

EXAMPLE 3

The system described in Example 2 was operated with the following feed rates to the first stage reactor:

3.27 g/min ilmenite ore (46.8% TiO$_2$)

12.28 g/min of dilute sulfuric acid solution containing 42.9% free H$_2$SO$_4$ with no titanous sulfate.

Powdered iron was also fed into the first stage at a rate of 0.19 g/min. The powdered iron was added to the reaction vessel to provide a reductant for the ferric iron content of the reaction mixture.

A 100% excess of ore over the stoichiometric requirement was maintained in the system as in Example 2. The first stage reactor was controlled at 106° C. and the second stage at 72° C. The first and second stages had residence times of about 9.4 hours and 47.1 hours, respectively. After equilibrium had been reached, it was found that 73.9% of the TiO$_2$ in the ore feed was reacted in the first stage and 20.9% in the second stage. An overall conversion of 94.9% was achieved with the two stages. Analysis of the final product was:

| 8.9% | Soluble Titanium (as TiO$_2$) |
|---|---|
| 8.8% | Free H$_2$SO$_4$ |
| 0.1% | Titanous Sulfate (as TiO$_2$) |

EXAMPLE 4

A reaction acid solution of 41.4% by weight sulfuric acid was prepared by combining 96.5% by weight sulfuric acid, spent sulfuric acid solution containing 16.32% by weight sulfuric acid, and water in a reactor vessel. The reaction acid was heated to 100° C. under constant agitation. 2130 grams of ilmenite ore, two times the stoichiometric quantity, was heated to 100° C. and charged to the reaction vessel. The temperature of the reaction mixture was then raised to about 108° C. and maintained for 10.5 hours. Samples of the reaction mixture were taken periodically and analyzed. Analysis of a sample about 45 minutes after the ilmenite ore addition showed an active acid content of 35.90% and titanium content of 1.72% (TiO$_2$) to provide a ratio of active acid:titanium of 20.87.

The analysis of the sample taken after 10.5 hours at about 108° C. showed an active acid content of 23.10 and a titanium content of 7.49% (TiO$_2$) to provide a ratio of active acid:titanium of 3.08.

EXAMPLE 5

This example illustrates multi-stage continuous digestion processes wherein a 41.7% sulfuric acid solution is reacted with a 100% stoichiometric excess of MacIntyre ilmenite ore assayed at 46.8% TiO$_2$ in the presence of a powdered iron reductant at an amount equal to 5% by weight of the ilmenite ore reacted. Table I provides digestor conditions of temperature, residence time, and conversion for the digestors in various multistage digestion processes.

The invention being thus described, it will be obvious that the same may be varied in many ways. Such variations are not to be regarded as a departure from the spirit and scope of the invention and all such modifications are intended to be included within the scope of the following claims.

TABLE I

TABLE OF DIGESTOR REACTION CONDITIONS

DIGESTOR REACTION CONDITIONS

| Type Of Process | 1st Digestor | | | 2nd Digestor | | | 3rd Digestor | | | 4th Digestor | | | 5th Digestor | | |
|---|---|---|---|---|---|---|---|---|---|---|---|---|---|---|---|
| | Temp (°C.) | Time (Hrs) | Conv (%) | Temp (°C.) | Time (Hrs) | Conv (%) | Temp (°C.) | Time (Hrs) | Conv (%) | Temp (°C.) | Time (Hrs) | Conv (%) | Temp (°C.) | Time (Hrs) | Conv (%) |
| two stage | 100–105 | 10 | 62 | 70–75 | 110 | 95 | | | | | | | | | |
| three stage | 104 | 4.8 | 45 | 100 | 4.8 | 70 | 78 | 64.2 | 95 | | | | | | |
| four stage | 96 | 16 | 63 | 89 | 16 | 84 | 75 | 16 | 91 | 73 | 16 | 95 | | | |
| four stage | 104 | 3 | 37 | 103 | 3 | 58 | 86 | 29 | 86 | 74 | 29 | 95 | | | |
| five stage | 104 | 10.5 | 64 | 88 | 10.5 | 79 | 84 | 10.5 | 88 | 76 | 10.5 | 92 | 72 | 10.5 | 95 |

We claim:

1. A process for producing a titanium sulphate solution, which comprises: reacting
   (a) a titaniferous bearing material in an amount between about 10% and about 400% above the stoichiometric amount of titaniferous bearing material necessary to react with sulfuric acid to provide titanium sulphate, and
   (b) a dilute sulfuric acid solution having a concentration between about 25% and about 60% by weight, based upon the total weight of said solution,
at a temperature below about 140° C. in the absence of a reducing agent; cooling the resulting reaction mixture to a temperature below about 110° C. without precipitating the reaction products to produce a reaction mixture containing titanium sulfate, and separating undissolved solids to produce a titanium sulfate solution.

2. The process of claim 1 wherein the reaction between said titaniferous bearing material and said dilute sulfuric acid solution is conducted at a temperature between about 55° C. and about 140° C.

3. The process of claim 1 wherein said resulting reaction mixture is cooled to a temperature below about 75° C.

4. A process for producing titanium dioxide which comprises (1) reacting
   (a) a titaniferous bearing material in an amount between about 10% and about 400% above the stoichiometric amount of titaniferous bearing material necessary to react with sulfuric acid to provide titanium sulphate, and
   (b) a dilute sulfuric acid solution having a concentration between about 25% and about 60% by weight, based upon the total weight of said solution,
at a temperature below about 140° C. in the absence of a reducing agent; (2) cooling the resulting reaction mixture to a temperature below about 110° C. without precipitating the reaction products; (3) removing undissolved solids and iron sulfate from said reaction mixture to provide a titanium sulphate solution; (4) hydrolyzing said titanium sulphate solution to provide a hydrate of titanium dioxide and spent sulfuric acid solution; (5) calcining said hydrate of titanium dioxide to provide titanium dioxide and (6) recovering the titanium dioxide.

5. The process of claim 4 wherein the reaction between said titaniferous bearing material and said dilute sulfuric acid is conducted at a temperature between about 55° C. and about 140° C.

6. The process of claim 4 wherein the reaction mixture is cooled to a temperature below about 75° C.

7. The process of claim 4 which includes passing the undissolved solids to reaction step (1) for reaction with sulfuric acid.

8. The process of claim 4 which includes passing the spent sulfuric acid solution from hydrolysis step (4) to reaction step (1) for reaction with titaniferous bearing material.

9. A continuous process for producing titanium dioxide which comprises:
   (1) continuously reacting (a) a titaniferous bearing material in an amount between about 10% and about 400% above the stoichiometric amount of titaniferous bearing material necessary to react with sulfuric acid to provide titanium sulphate, and (b) a dilute sulfuric acid solution having a concentration between about 25% and about 60% by weight, based upon the total weight of said solution, at a temperature below about 140° C. in the absence of a reducing agent;
   (2) cooling the resulting reaction mixture to a temperature below about 110° C. in a second reaction vessel without precipitating the reaction products while continuing the reaction;
   (3) separating unreacted titaniferous bearing material from the reaction mixture to provide a solution of iron sulphate and titanium sulphate;
   (4) removing iron sulphate from said solution of iron sulphate and titanium sulphate to provide a solution of titanium sulphate;
   (5) hydrolyzing said titanium sulphate solution from (4) to provide a titanium dioxide hydrate, and spent sulfuric acid solution;
   (6) calcining said titanium dioxide hydrate to provide titanium dioxide and
   (7) recovering titanium dioxide.

10. The process of claim 9 wherein the reaction between said titaniferous bearing material and said dilute sulfuric acid is conducted at a temperature of about 110° C. and the resulting reaction mixture is cooled in step (2) to a temperature below about 75° C. to complete the reaction.

11. The process of claim 9 wherein the reaction in step (1) is conducted in at least two stages in which said titaniferous bearing material and said dilute sulfuric acid are reacted in a first stage to provide a reaction mixture having a ratio of active acid to titanium dioxide in the reaction solution in the range of between about 2.0 and 3.5 and thereafter conducting said reaction in a second stage at a temperature below about 100° C.

12. The process of claim 11 wherein the temperature of the reaction in said first stage is below about 110° C.

13. The process of claim 11 wherein said reaction is conducted by feeding said titaniferous bearing material and said dilute sulfuric acid concurrently into said first stage.

14. The process of claim 9 wherein the separated unreacted titaniferous bearing material is passed to the reaction mixture for reaction with sulfuric acid.

15. The process of claim 9 wherein spent sulfuric acid solution is passed to the reaction mixture for reaction with titaniferous bearing material.

16. The process of claim 9 wherein the reaction in step (2) is continued until the reaction mixture has a ratio of active acid to titanium dioxide in the reaction solution of about 2.0.

* * * * *